(12) United States Patent
Hall

(10) Patent No.: US 8,398,159 B1
(45) Date of Patent: Mar. 19, 2013

(54) FRAME MEMBERS WITH TAB AND SLOT CONNECTIONS

(76) Inventor: Stephen Hall, Sandy, UT (US)

( * ) Notice: Subject to any disclaimer, the term of this patent is extended or adjusted under 35 U.S.C. 154(b) by 0 days.

(21) Appl. No.: 13/233,863

(22) Filed: Sep. 15, 2011

(51) Int. Cl.
*B62D 21/02* (2006.01)

(52) U.S. Cl. .................................... 296/203.01

(58) Field of Classification Search ............ 296/203.01, 296/29
See application file for complete search history.

(56) References Cited

U.S. PATENT DOCUMENTS

| 4,097,716 | A | * | 6/1978 | Reichelt et al. | 219/137 R |
|---|---|---|---|---|---|
| 4,365,736 | A | * | 12/1982 | Stumm | 228/121 |
| 5,159,175 | A | * | 10/1992 | Loeber | 219/137 R |
| 5,249,818 | A | * | 10/1993 | Patterson | 280/281.1 |
| 5,915,781 | A | | 6/1999 | DeRees | |
| 6,131,286 | A | * | 10/2000 | Kelly et al. | 29/897.2 |
| 6,135,666 | A | * | 10/2000 | Kelly et al. | 403/256 |
| 6,241,144 | B1 | * | 6/2001 | Mandon | 228/135 |
| 6,444,954 | B1 | * | 9/2002 | Blankenship | 219/391 |
| 6,907,666 | B2 | | 6/2005 | Mills | |
| 7,044,677 | B2 | * | 5/2006 | Moser et al. | 403/252 |
| 7,849,601 | B2 | | 12/2010 | Hedderly | |
| 2002/0158484 | A1 | * | 10/2002 | Delavalle et al. | 296/29 |
| 2007/0000924 | A1 | * | 1/2007 | Chen | 220/23.4 |
| 2008/0169680 | A1 | | 7/2008 | Hedderly | |
| 2012/0186438 | A1 | * | 7/2012 | Frey et al. | 89/37.01 |

* cited by examiner

*Primary Examiner* — H Gutman
(74) *Attorney, Agent, or Firm* — Philip W. Townsend, III

(57) ABSTRACT

In one aspect of the present invention, a vehicle frame comprises a plurality of frame members including at least two side plate members interlocked with a bottom plate member and a vertically loaded plate member. The bottom plate member and the vertically loaded plate member are non-parallel. The side plate members support the bottom plate member and the vertically loaded plate member through a plurality of tab and slot connections.

17 Claims, 11 Drawing Sheets

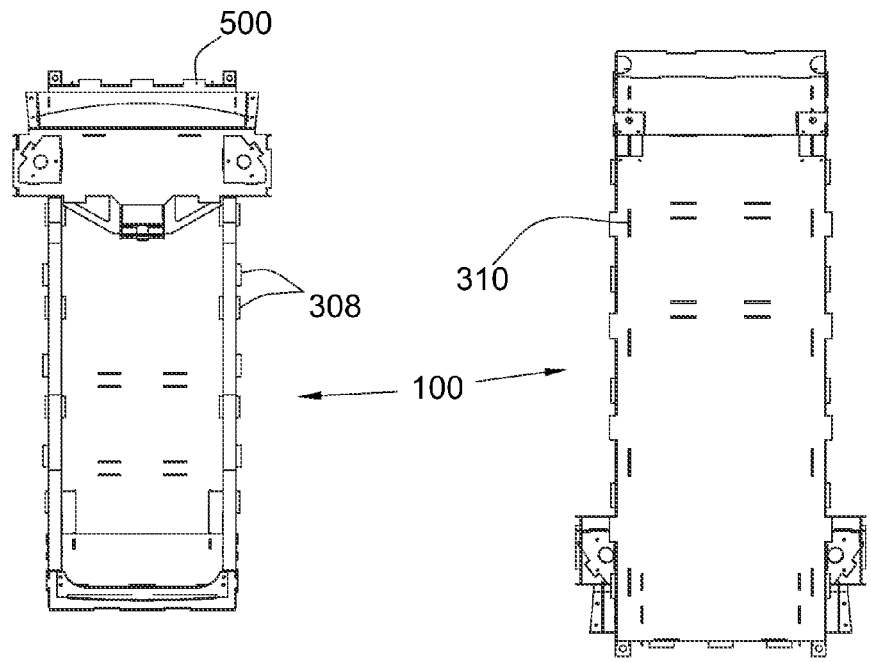
Fig. 5a
Fig. 5b
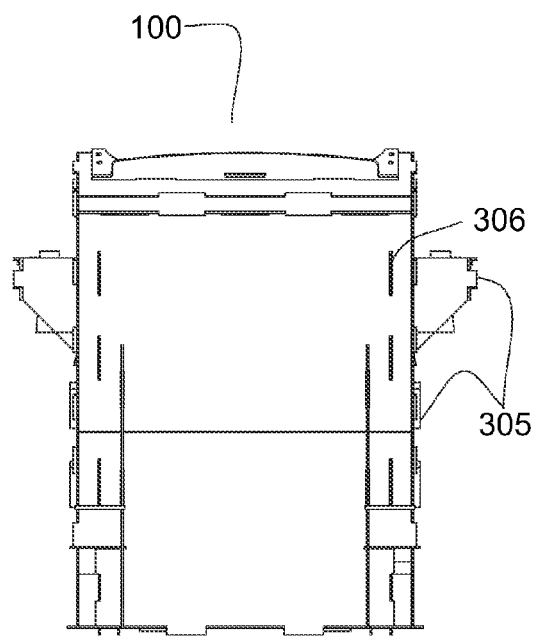
Fig. 5c

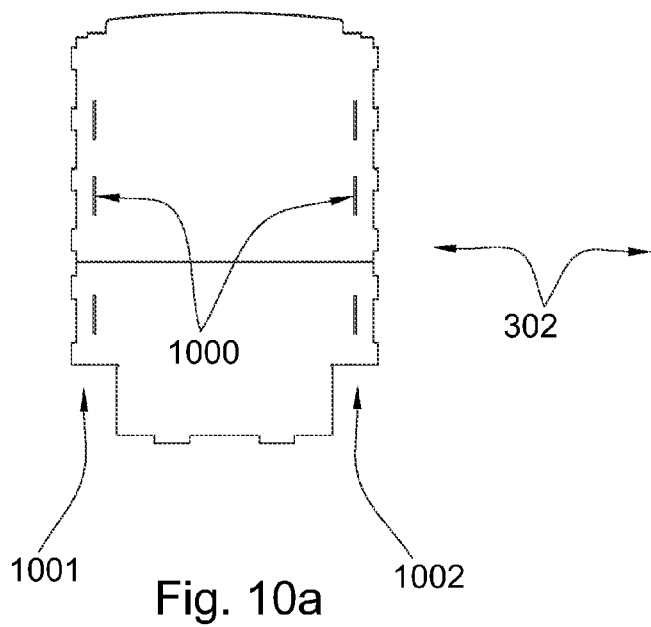
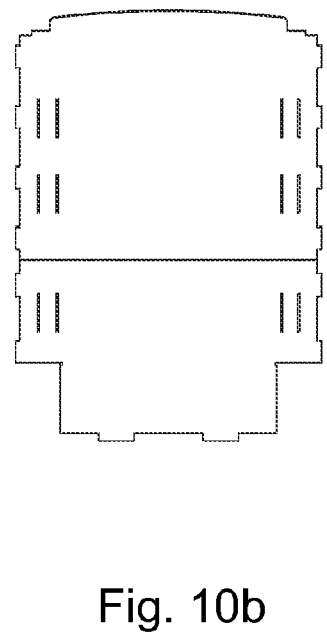
Fig. 10a  Fig. 10b
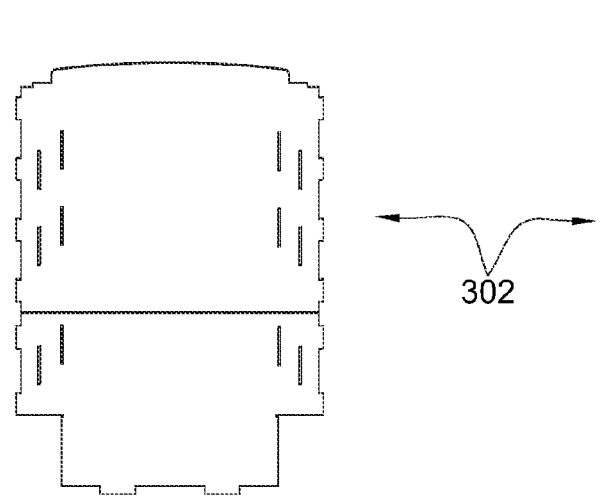
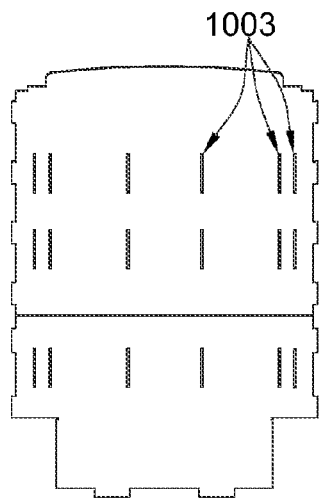
Fig. 10c  Fig. 10d

FRAME MEMBERS WITH TAB AND SLOT CONNECTIONS

BACKGROUND OF THE INVENTION

This invention relates to assembly of vehicle frames, particularly to the assembly of vehicle frames. Vehicle frame manufacturing is disclosed in the prior art.

U.S. Pat. No. 7,849,601 to Hedderly, which is herein incorporated by reference for all that it contains, discloses a method of manufacturing a vehicle. The method includes assembling a set of body panels to a vehicle body structure by interlocking a body panel mating feature with a body mating feature.

U.S. Publication No. US2008/0169680 to Hedderly, which is herein incorporated by reference for all that it contains, discloses a vehicle body assembly having a set of castings. Each member of the set of casting interlocks with another member of the set of castings to create a vehicle body structure.

U.S. Pat. No. 6,907,666 to Mills, which is herein incorporated by reference for all that it contains, discloses a method of assembly of a vehicle body structure. A second component is formed so as to have a first locating construction in the first component so as to uniquely locate the second component with respect to the first component. The third component is formed so as to have a second mating structure which is adapted to mate with the second locating construction in the first component so as to uniquely locate the third component with respect to the first component. The second component is located with respect to the first component by mating the first mating structure on the second component with the first locating construction in the first component with the first locating construction in the first component, the third component is located with respect to the first component by mating the second mating structure on the third component with the second locating construction in the first component. The second and the third component are welded to the first component.

BRIEF SUMMARY OF THE INVENTION

In one aspect of the present invention, a vehicle frame comprises a plurality of frame members including at least two side plates interlocked with a bottom plate member and a vertically loaded plate member. The bottom plate member and the vertically loaded plate member are non-parallel. The side plates support the bottom plate member and the vertically loaded plate member through a plurality of tab and slot connections.

The vehicle frame member may form a motorized trike. The plate members forming the vehicle may be welded together at seams. The side plate member may be connected to the vertically loaded member at a rear end and also attached is a forward member at a forward end of the member.

At least a portion of the vertically loaded plate may form an obtuse angle with the bottom plate member. That vertically loaded member may be bent along its width. The vertically loaded plate member may have tab connections that are non-parallel.

The tab connections may be located on an edge of at least one of the plate members. The non-parallel tabs may enter the slot connections disposed within the side plate member. The tabs may be longer then adjacent slots, the tabs extend beyond an exit of the slots. The tabs may be positioned to carry a weight of the frame. The plurality of tab and slot connections may be welded into place as well as position the frame members for welding.

The bottom and vertically loaded plate members may be configured to support an internal side plate member. The internal side plate member may be attached and welded to the bottom and vertically loaded plate member before the side plate member. The internal side plate member may have tabs that enter slots of the tab and slot connections in the vertically loaded member while the vertically loaded member has tabs that enter slots in the side plate, the members interlocking together.

BRIEF DESCRIPTION OF THE DRAWINGS

FIG. 5a is a top view of another embodiment of a motorized vehicle body.

FIG. 5b is a bottom view of another embodiment of a motorized vehicle body.

FIG. 5c is a rear view of another embodiment of a motorized vehicle body.

FIG. 10a is a detailed view of an embodiment of a motorized vehicle body member.

FIG. 10b is a detailed view of another embodiment of a motorized vehicle body member.

FIG. 10c is a detailed view of another embodiment of a motorized vehicle body member.

FIG. 10d is a detailed view of another embodiment of a motorized vehicle body member.

FIG. 11b is a perspective view of an embodiment of a water vessel.

DETAILED DESCRIPTION OF THE INVENTION AND THE PREFERRED EMBODIMENT

Figure 1:
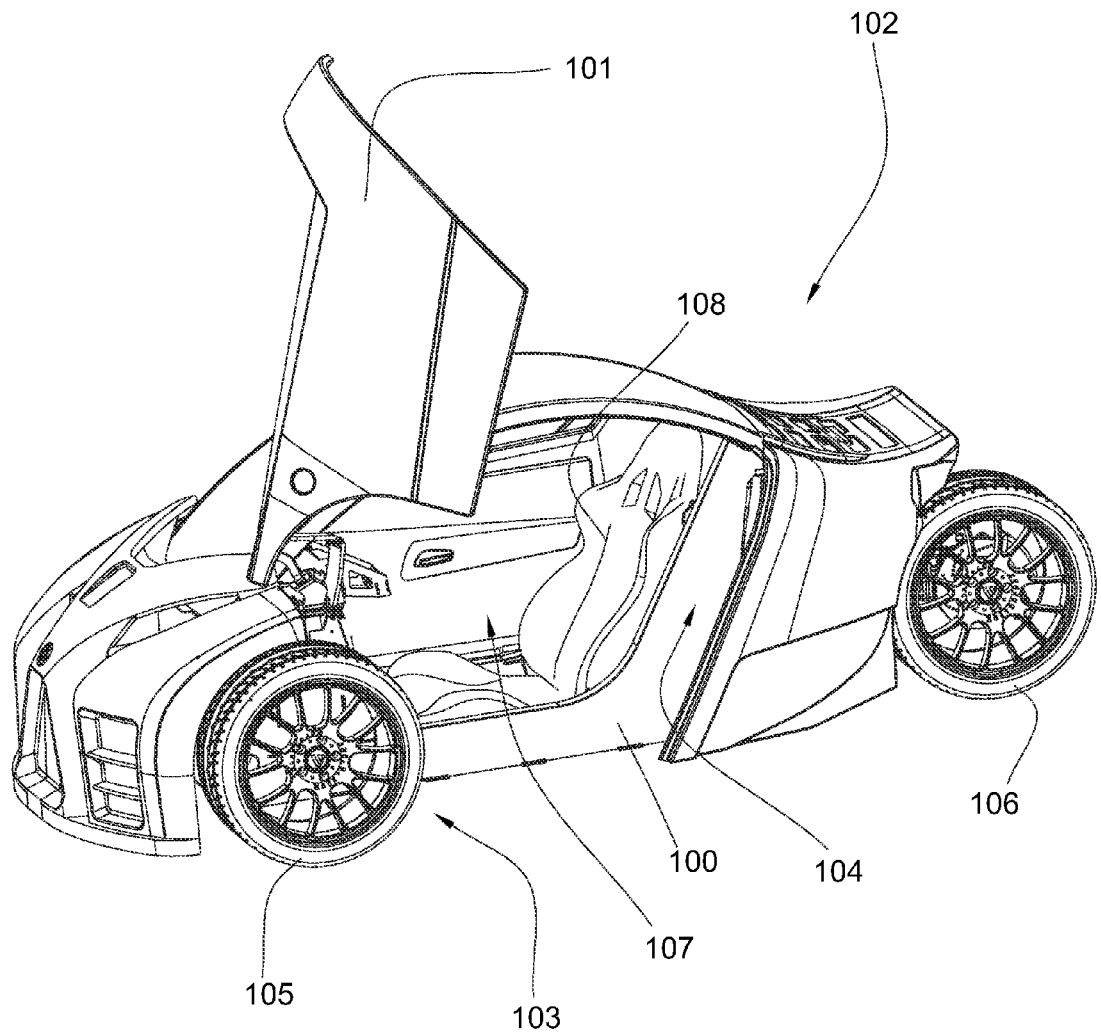
FIG. 1 is a perspective view of an embodiment of a motorized vehicle.

FIG. 1 discloses an embodiment of a perspective view of a vehicle 102 with an open door 101. The vehicle 102 may comprise a vehicle frame 100 that comprises a front portion 103 and a rear portion 104. Two steerable front wheels 105 may connect to the front portion 103 and a single rear wheel 106 may connect to the rear portion 104. The vehicle 102 may comprise an enclosed passenger compartment 107. The door 101 may be disposed intermediate the front 103 and rear 104 portions enabling entrance into the vehicle 102. A seat 108 may be placed within the vehicle 102 on the vehicle frame 100.

Figure 2:
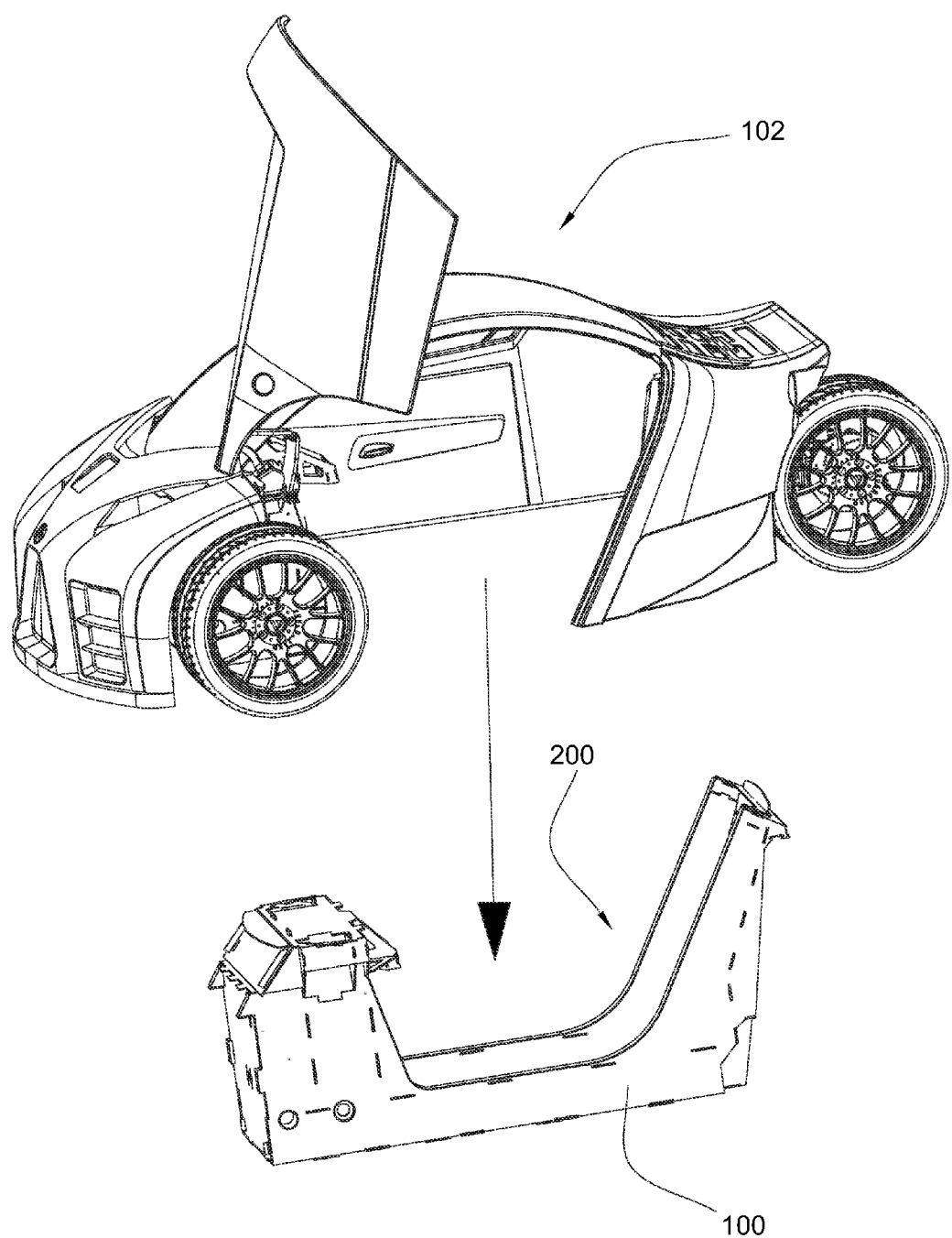
FIG. 2 is an exploded view of another embodiment of a motorized vehicle.

FIG. 2 discloses an embodiment of the vehicle frame 100 and the motorized vehicle 102. The vehicle frame 100 may comprise a plurality of vehicle frame members 200. The frame members 200 may form a motorized trike frame. The frame members may be configured to support a vehicle load and support the vehicle during use. The frame members 200 may comprise other vehicle components attached to the members 200.

Figure 3A:
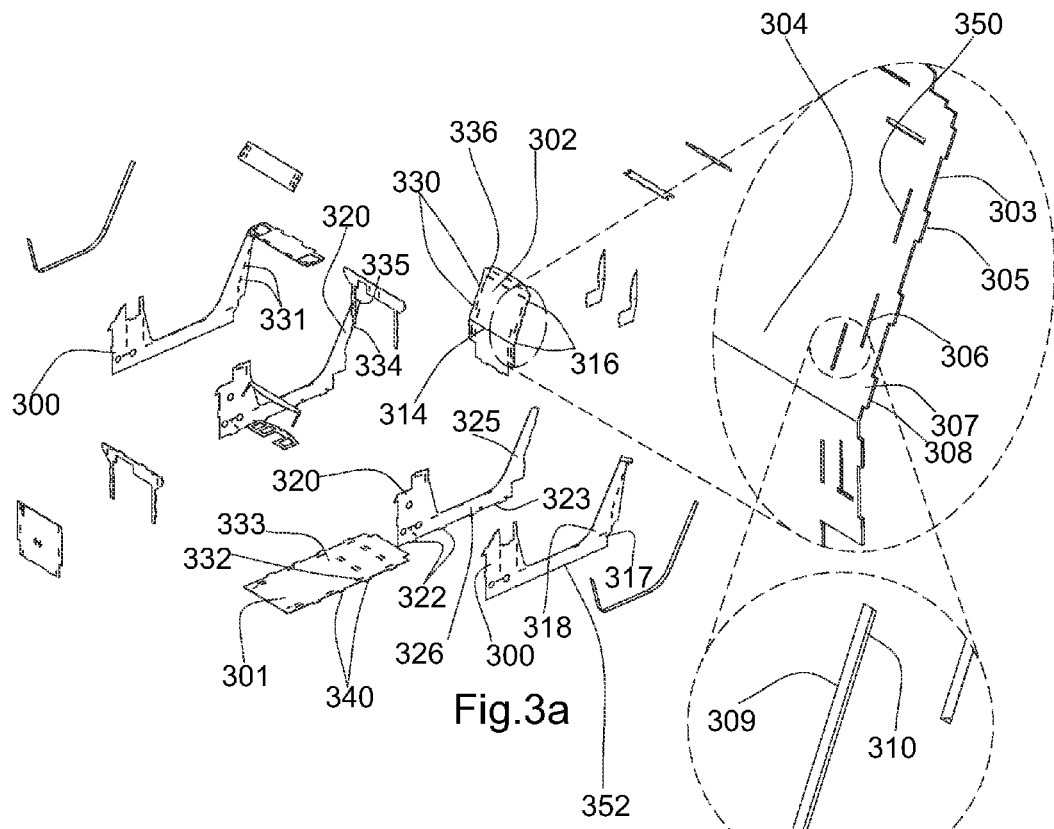
FIG. 3a is an exploded view of another embodiment of a motorized vehicle body.
Figure 3B:
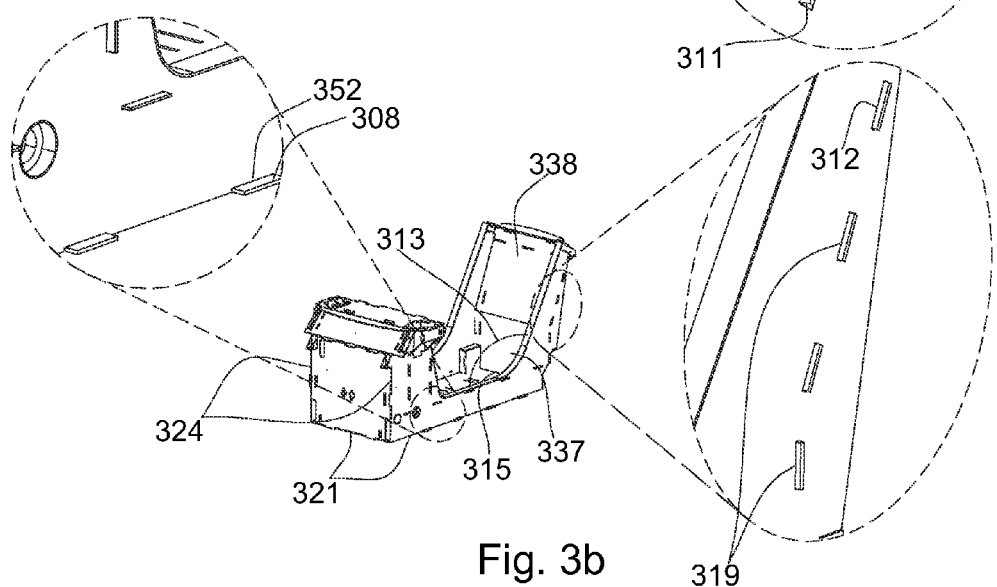
FIG. 3b is a detailed view of another embodiment of a motorized vehicle body.

FIGS. 3a and 3b disclose an embodiment of the frame members 200 of the vehicle frame 100. The vehicle frame members 200 include at least two side plates 300, two internal side plates 320, a bottom plate 301 and a vertically loaded plate member 302. The bottom and vertically loaded plate members 301, 302 are non-parallel. At least one of the frame members 200 may comprise tabs 305 and/or slots 306. The slots 306 may form a gap in the at least one frame member 200. The tabs 305 may be located on at least one edge 303 of the at least one frame member 200, extending from the edge 303 of the member 200.

The vertically loaded plate member 302 may be configured to sustain a vertical load. The load may be a weight of the frame components 200. To sustain the load at least a portion of the vertically loaded plate 302 may form an obtuse angle 313 with the bottom plate member 301. The obtuse angle 313 may allow the vertically loaded member 302 to be more vertical than the bottom plate member 301. Making the vertically loaded member substantially vertical may help the vehicle frame to support vertical loads.

The vertically loaded member 302 may be bent along its width 314. This may allow the bottom plate member 301 and vertically loaded member 302 to be substantially perpendicular at a connection 315. The connection 315 may be strongest when nearly perpendicular. The vertically loaded member 302 may then bend such that a portion of the vertically loaded member 302 may form the obtuse angle 313. Bending the vertically loaded member 302 may form non-parallel tabs on the edge 303 of the vertically loaded member 302.

The slots 305 formed into the vehicle frame members 200 may comprise a variety of geometries. Some slots 305 may be configured to be through slots 305; these slots 305 form a gap 350 in an entire thickness 311 of the plate members. Some of the slots 305 may be configured to be channel slots 352, which may be formed on the edge 303 of the plate members 200 and be configured to partially surround but not enclose the gap 350 formed by the slot 352.

The non-parallel tabs 316 on the edge 303 of the vertically loaded member 302 may be configured to enter matching non-parallel slots 317 on a face 318 of the side plate member 300. The non-parallel tabs 316 and slots 317 may form the same obtuse angle 313 with the bottom plate member 301. The obtuse angle 313 formed between the vertically loaded member 302 and the bottom plate member 301 may also strengthen connections between the side plate members 300, bottom plate members 301, and vertically loaded members 302. Non-parallel connections 319 may resist translation of the frame members 200 in different directions which may hold the frame members 200 more rigidly together, better interlocking them.

The internal side plate member 320 may be attached to the bottom plate member 301 and vertically loaded plate member 302. The internal side plate member 320 may be configured to stabilize the vehicle frame 100. The internal side plate member 320 may comprise tabs 322 along edges 325 and slots 323 formed in a face 326 of the member 320. Tabs 322 may be formed along a bottom edge 323 of the plate 320 that are configured to enter slots 332 formed in a face 333 of the bottom plate member 302. The bottom plate member 302 may be configured to support the internal side plate member 320 by the slots 333 holding the tabs 322 in place.

The internal side plate member 320 may also comprise tabs 334 along a rear edge 335. The tabs 334 along the rear edge 335 may be configured to enter slots 336 formed in the face 304 of the vertically loaded member 302. The slots 336 may be formed on a first 337 and second 338 end of the vertically loaded plate member 302. The rear edge 335 of the internal side plate 320 may be configured to match the face 304 of the vertically loaded member 302. The rear edge 335 may follow the first end 337, second end 338, and bend in the vertically loaded member 302. The vertically loaded plate member 302 may be configured to support the internal side plate member 320.

The internal side plate member 302 may be configured to be attached and welded to the bottom plate member 301 and vertically loaded member 302 before the side plate member 300 is attached and welded to the bottom plate member 301 and vertically loaded member 302. Attaching and welding the internal side plate member 320 first may allow the internal member 320 to be appropriately welded before a proximate adjacent side plate member is assembled and welded.

The internal side plate member's tabs 334 that enter slots 336 in the vertically loaded member 302 and bottom member 301 may further interlock the members 301,302,320. The vertically loaded member 302 further comprises tabs 305 that enter the side plate member 320 and bottom member 301. The bottom member 301 comprises tabs 340 that enter the side plate member 320. By inserting the aforementioned members into one another in a pattern as described the members 301, 302,320 become more interlocked. Interlocking the members 301,302,320 in such a manner may increase the ability of the tabs 305 to sustain the weight load of the members 301, 302, 320 through the slots 304 supporting the tabs 305 in different axes.

The tabs 305 may comprise a base end 307 and an extending end 308. The base end 307 may be a portion of the tab 305 closest to the frame member 200. The extending end 308 may extend from the base end 307. The tabs 305 located on the at least one edge 303 of the at least one of the plate members 200 may be configured to enter the slots 306 formed in at least one face 304 of the plate members 200.

The tab and slot connections 312 may be configured to position the frame members 200 for welding. The connections 312 may have unique designs such that certain tabs 330 must enter mated slots 331. The certain tabs 330 may then be welded to the mated slots 331; correctly positioning the frame members 200.

In some embodiments, the plate members may be replaced by other members. The other members may be comprised of bars, rods, booms, crossbars, rails, shafts, and/or slabs. The members may distribute loads, stresses, and strains in a similar manner as the plate members. The members may also be assembled using the tab and slot connections.

In some other embodiments, a groove slot may be formed into one of the plate members but be configured to have a back wall; the groove slot may have a depth that is less than the thickness of the plate members.

Figure 4A:
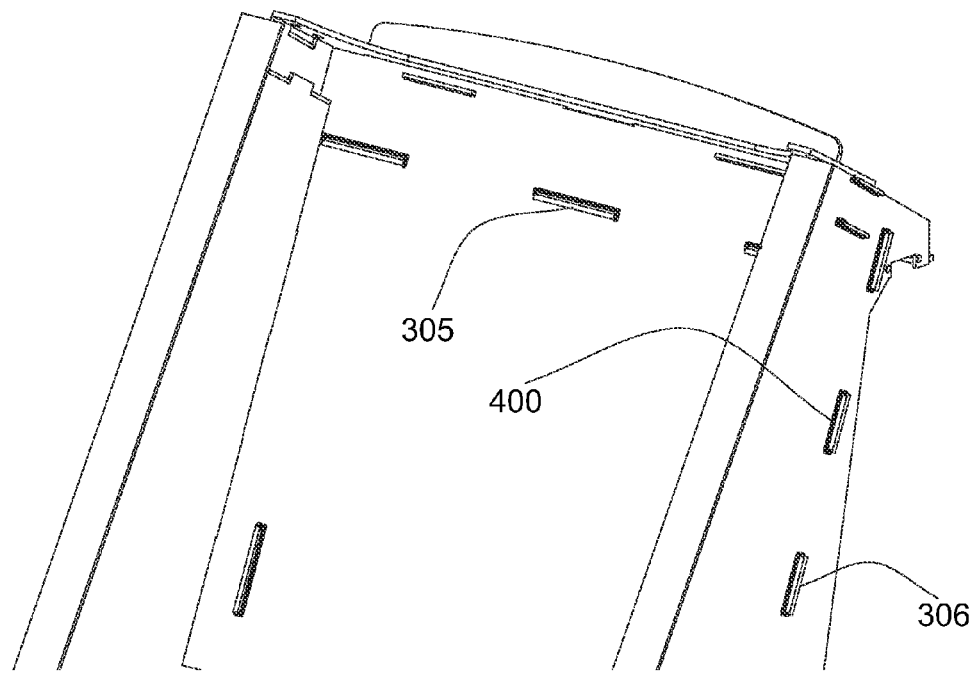
FIG. 4a is an orthogonal view of another embodiment of a motorized vehicle body.

FIG. 4a discloses an embodiment of the vehicle vehicle frame. The extending end 308 of the tabs 305 may be welded to the exit 310 of the slots 306. After assembly, the frame members 200 may be welded at the tab and slot connections 312. The frame members 200 may also be welded at seams 321 formed between the members 200.

Welding the tab and slot connections 312 may increase a strength in the connections 312. The welds 402 may be configured to hold the tabs 305 and the slots 306 of the tab and slots connections 312 together. This may allow the tabs 305 and slots 306 to sustain external forces.

Figure 4B:
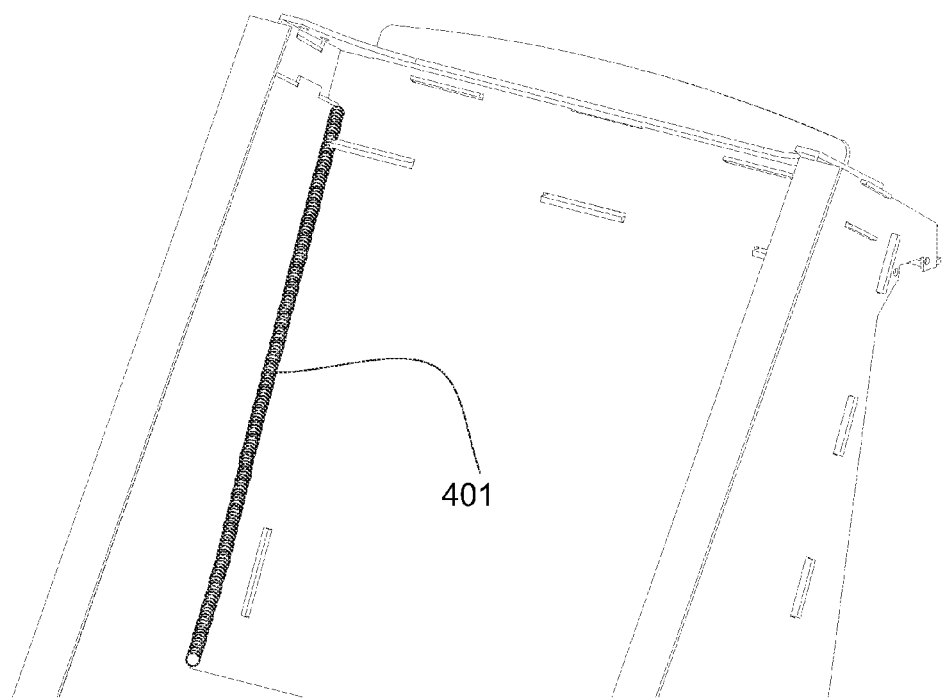
FIG. 4b is an orthogonal view of another embodiment of a motorized vehicle body.

FIG. 4b discloses an embodiment of the vehicle vehicle frame. The vehicle frame may be welded at structural seams 401. The seams 401 configured to sustain forces from external forces during operation and sustain the load of the weight members may be termed structural seams 401. The structural seams 401 may be configured to withstand external forces. The plate members 200 may be fully welded together along the structural seams 401. Fully welding the structural seams may add strength to the vehicle members 200.

FIG. 5a discloses an embodiment of a top view of the vehicle frame 100. The tabs' extending ends 308 extend past the exit 310 of the slots 306 in the tab and slot connections 312 which may allow the tabs 305 to fully support the weight load of the members 200 as an entire length 500 of the tab 305 may be supported by the entire thickness 311 of the slots 306.

FIG. 5b discloses an embodiment of a bottom view of the vehicle frame 100. Tabs 305 located on the bottom plate member 302 are configured to extend past a width 510 of the side plate member 300 through the open slot 352 and correctly position the side plate member 300.

FIG. 5c discloses an embodiment of a back view of the vehicle frame 100. A larger connection 510 allows the slots 306 to support the tab 305 through the entire thickness 311 of the slot 306; strengthening the connection. The side plate members 300 may comprise tabs 305 that extend past a width 511 of the bottom plate member 302 and correctly position the bottom plate member 302.

Figure 6:
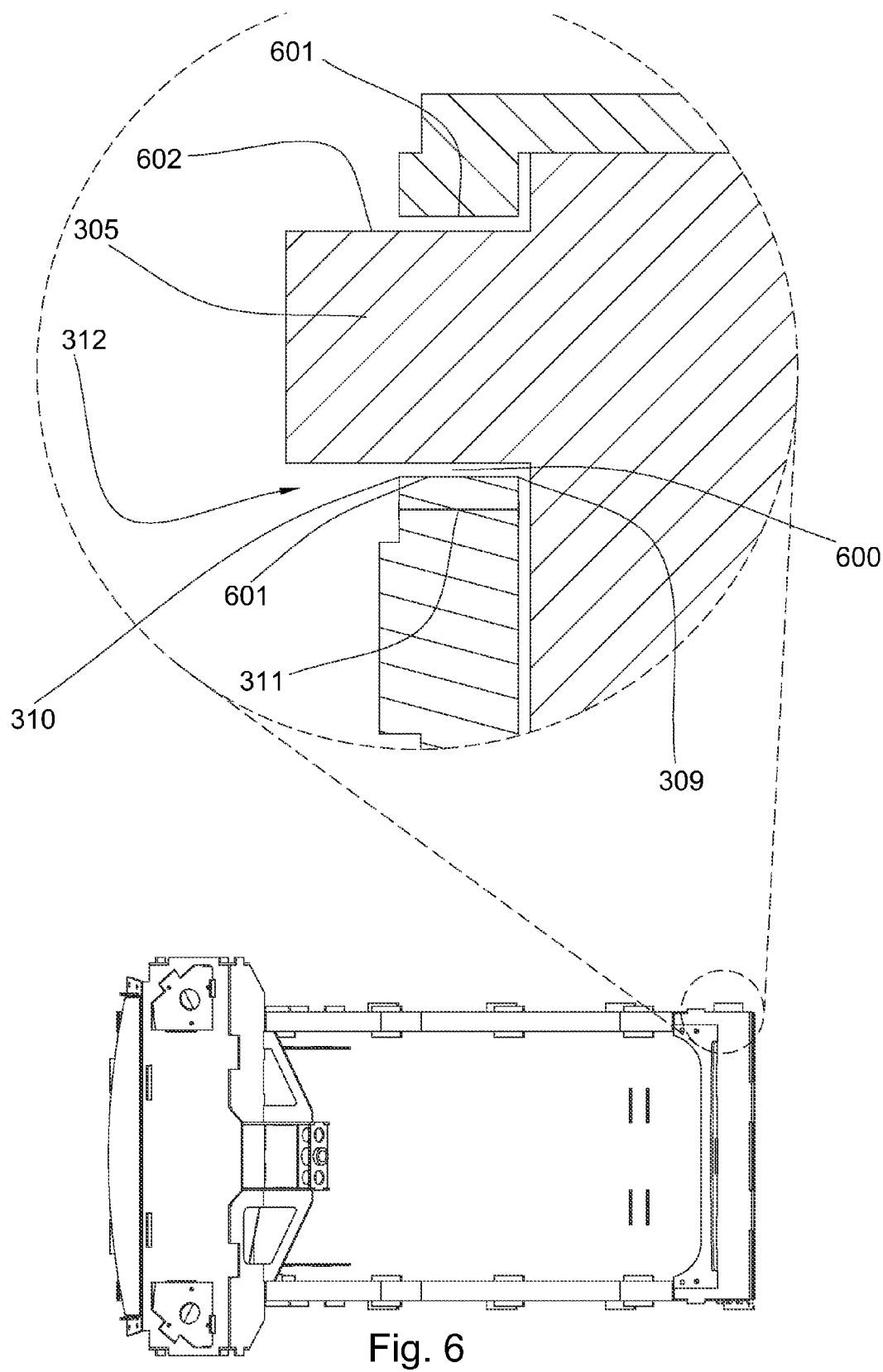
FIG. 6 is a detailed view of another embodiment of a motorized vehicle body.

FIG. 6 discloses an embodiment of the tab and slot connections 312. The tab and slot connections 312 may be located on every frame member 200. The tab and slot connections 312 may be configured to carry the weight of the frame members 200. The tab 305 may be nearly as large as the slot 306 while still being able to slide through the slot 306. This may create a tight connection 312 between an inner surface 601 of the slot 306 and an outer surface 602 of the tab 305. The tight connection 312, with a minimal gap 600 between the tab 305 and slot 306, may allow the slot 306 to support the tabbed members 200 by holding the tabbed members 200 nearly in place and restraining the tabbed members 200 from sliding or shifting.

The slots 306 may have an entrance 309 and an exit 310. The tabs 305 may be configured to enter the entrance 309 and exit outward the exit 310. The slots 306 may also have a thickness 311. The thickness 311 of the slots 306 may be the same as a surrounding thickness 311 of the frame member 200. The tabs 305 entering the slots 306 may form tab and slot connections 312. The tabs 305 entering the slots 306 may interlock the vehicle part members 200 together.

Figures 7A, 7B, 7C:
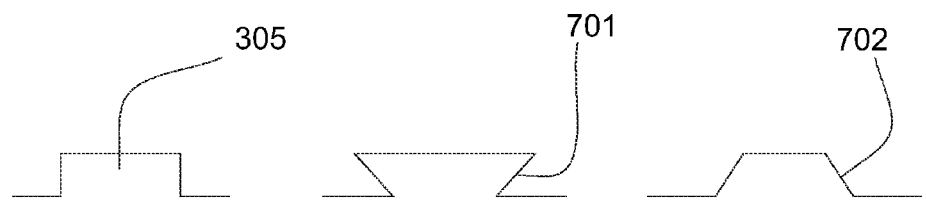
FIG. 7a is a perspective view of an embodiment of a tab connection.
FIG. 7b is a perspective view of another embodiment of a tab connection.
FIG. 7c is a perspective view of another embodiment of a tab connection.
Figures 7D, 7E, 7F:
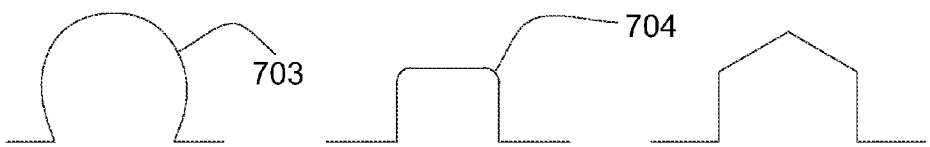
FIG. 7d is a perspective view of another embodiment of a tab connection.
FIG. 7e is a perspective view of another embodiment of a tab connection.
FIG. 7f is a perspective view of another embodiment of a tab connection.

FIGS. 7a-7f disclose embodiments of the tab 305 in the tab and slot connections 312. FIG. 7a discloses an embodiment of a rectangular tab 305. The rectangular tab 305 may be easy to manufacture and insert into an adjacent slot connection. FIG. 7b discloses a tab 305 that may enter the adjacent slot and a side edge 701 may be configured to catch the slot exit 310 after extending through the slot 306 to keep the tab 305 and slot 306 connected. FIG. 7c discloses an embodiment that may enter the slot 306 easily due to angled sides 702. Stresses on the sides 702 may be minimized due to the shape of the tab 305. FIG. 7d discloses an embodiment that may be configured to catch the slot 306 after assembly so that the tab 305 stays in the slot 306. Also, curves 703 on the extending end 308 may diffuse stress throughout the extending end 308. FIG. 7e discloses an embodiment of the tab 305 that is configured to enter the slot 306 easily due to rounded corners 704 on the extending end 308. The rounded corners 704 may also diffuse stress evenly throughout the extending section 308 allowing the tab 305 to withstand a larger load. FIG. 7f discloses an embodiment of the tab 305 that may enter the slot 306. A tab's distal end 710 may help the tab 305 easily enter the slot 306.

Figures 7G, 7H, 7I:
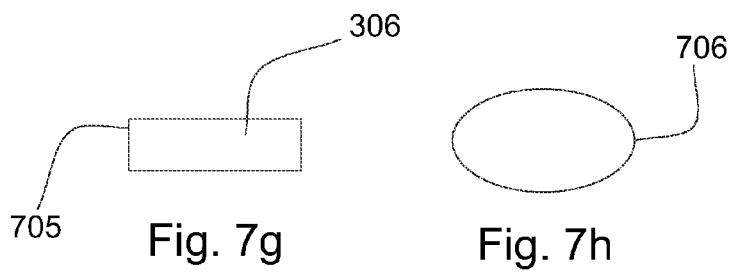
FIG. 7g is a perspective view of an embodiment of a slot connection.
FIG. 7h is a perspective view of an embodiment of a slot connection.
FIG. 7i is a perspective view of an embodiment of a slot connection.
Figures 7J, 7K, 7L:
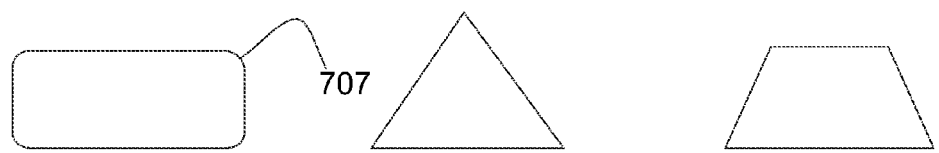
FIG. 7j is a perspective view of an embodiment of a slot connection.
FIG. 7k is a perspective view of an embodiment of a slot connection.
FIG. 7l is a perspective view of an embodiment of a slot connection.

FIGS. 7g-7l disclose embodiments of the slot 306 in the tab and slot connections 312. FIG. 7g discloses an embodiment of the slot 306 that may support an entering tab 305 and transfer stress from the tab 305 to the slot 306 when the tab 305 rests against an inner surface 501 of the slot 306. Also, the rectangular shape 705 may be easy to manufacture for the slot 306. FIG. 7h discloses an embodiment where the tab 305 may easily enter the slot 306 due to the rounded edges 706. FIG. 7i discloses an embodiment of a skewed rectangular slot 714. The rectangular slot 714 may be configured to support the tab 305 from four directions. FIG. 7j discloses an embodiment where the stresses on the tab 305 and slot 306 may be diffused through rounded corners 707, adding strength to the connection. FIG. 7k discloses an embodiment where the slot 306 forms a triangle 713; the triangle 713 may support the tab 305 from all three sides of the triangle 713. The stress may also be equally distributed throughout the tab 305 and slot 306. FIG. 7l discloses an embodiment where the slot 305 has top and bottom edges 711, 712 that extend different lengths, the top and bottom edges 711, 712 may be manufactured for easy assembly of tabs 305 into the slots 306.

Figure 8A:
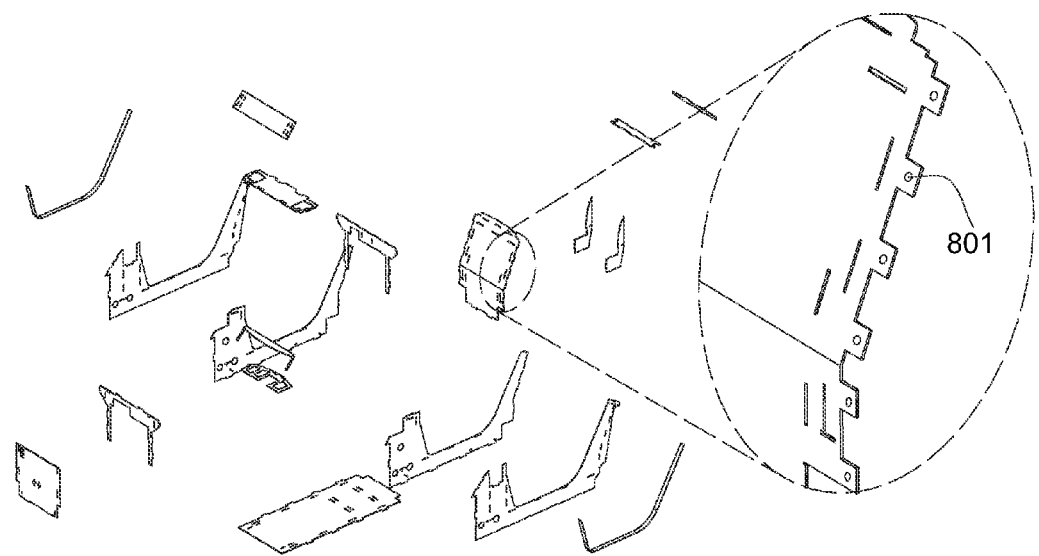
FIG. 8a is an exploded view of another embodiment of a motorized vehicle body.
Figure 8B:
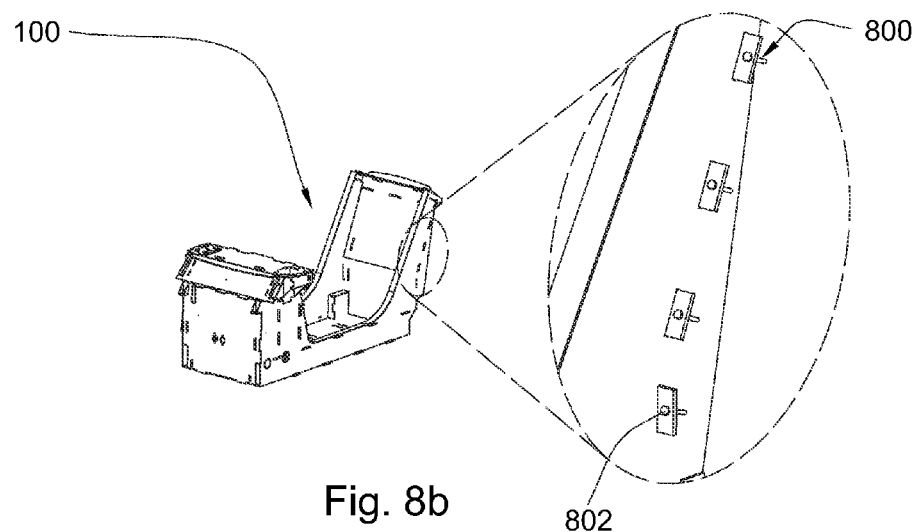
FIG. 8b is a detailed view of another embodiment of a motorized vehicle body.

FIGS. 8a and 8b disclose another embodiment of the tab and slot connections 312 comprising a bolt mechanism 800. The slots 306 may comprise gaps 801 where a bolt 802 of the bolt mechanism 800 is configured to enter. The bolt mechanism 800 may be configured to hold the plate members 200 in place once assembled. The bolt mechanism 800 may decrease a difficulty of securing the frame members 200 after assembly.

Figures 9A, 9B:
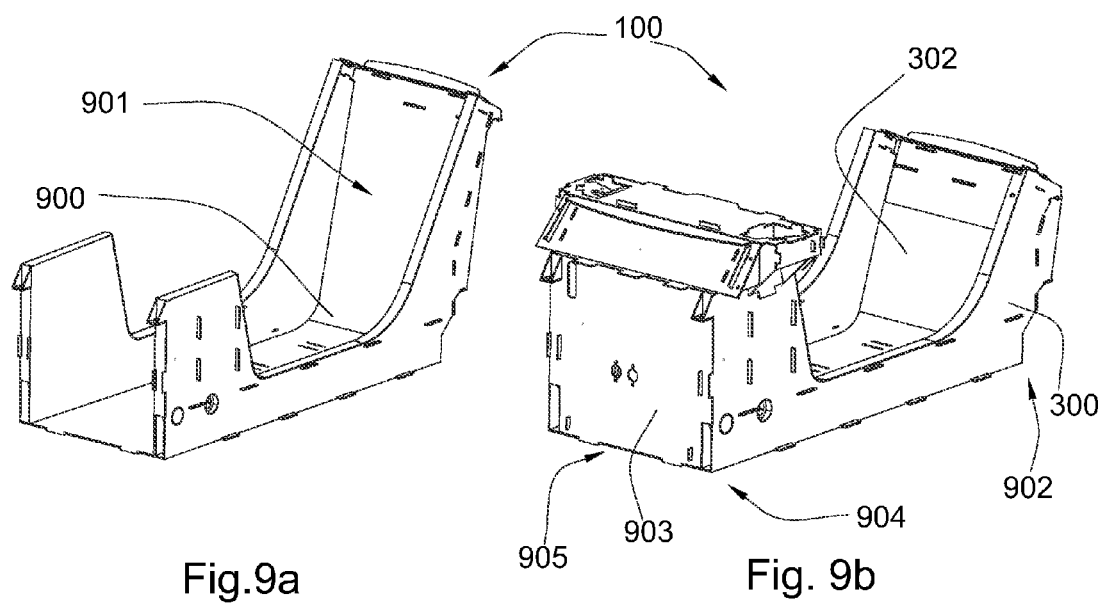
FIG. 9a is a perspective view of another embodiment of a motorized vehicle body.
FIG. 9b is a perspective view of another embodiment of a motorized vehicle body.
Figures 9C, 9D:
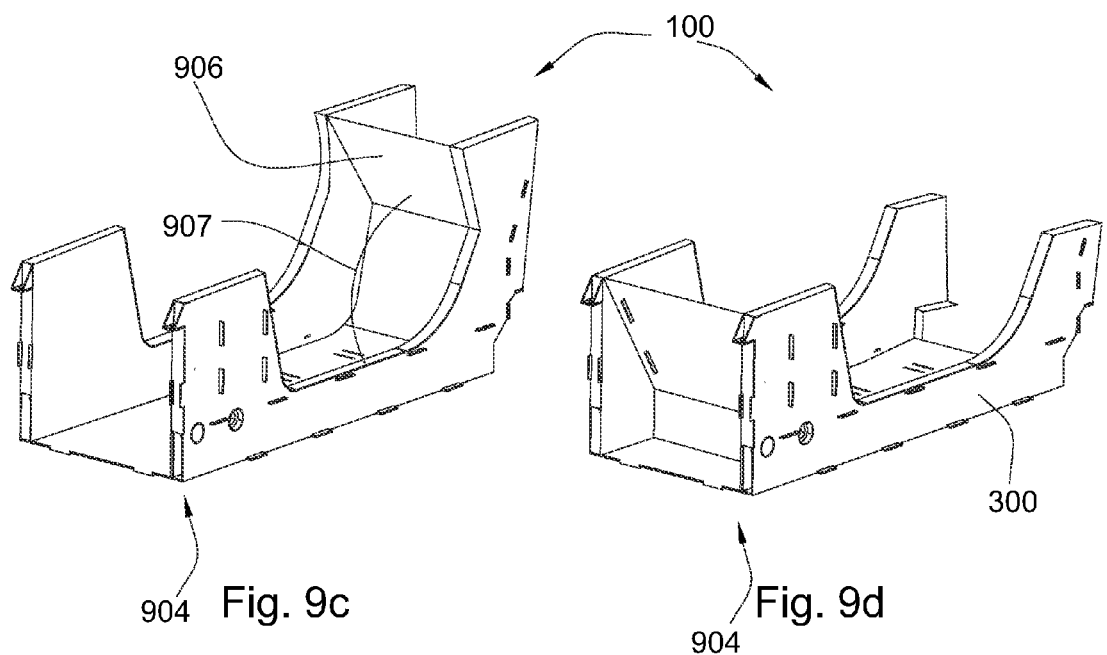
FIG. 9c is a perspective view of another embodiment of a motorized vehicle body.
FIG. 9d is a perspective view of another embodiment of a motorized vehicle body.
Figure 11A:
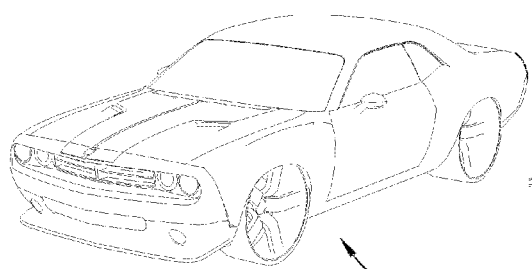
FIG. 11a is a perspective view of an embodiment of an automobile.
Figure 11C:
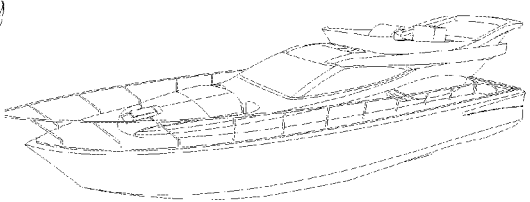
FIG. 11c is a perspective view of an embodiment of a front-loader vehicle.
Figure 11C:
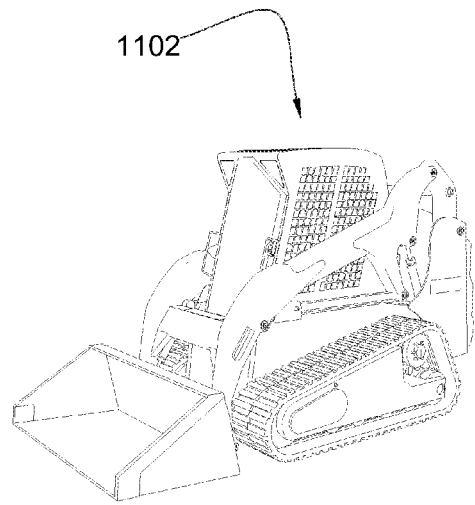
Figure 11D:
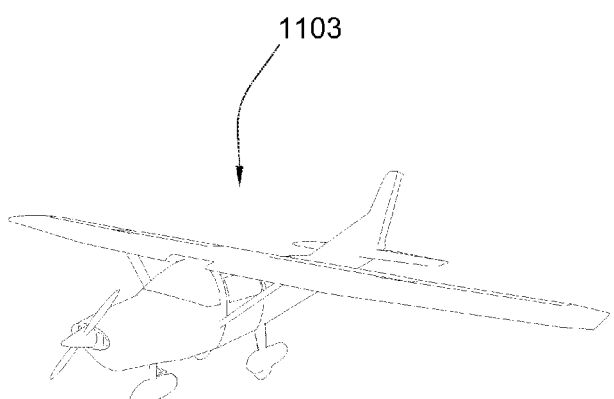
FIG. 11d is a perspective view of an embodiment of an airplane.

FIGS. 9*a*-9*d* disclose embodiments of the vehicle frame 100. FIG. 9*a* discloses an embodiment with a vertically loaded plate member 901 with a rounded section 900. The rounded section 900 may be located towards a bottom of the vertically loaded member. In some embodiments, the bottom plate and the vertically loaded plate are manufactured together as one piece with a rounded section joining them. FIG. 9*b* discloses an embodiment where the side plate member 300 is connected to the vertically loaded plate member 302 at a rear end 902 of the side plate member 300. Also attached to the side plate member 300 may be a forward vertical member 903 at a forward end 904 of the side plate member 300. The forward vertical support 903 may attach to the bottom plate member 302 at a bottom side 905 of the vehicle frame 100. The forward vertical member 903 may support the loads of the side plate member 300 and the internal side plate member 320 and stabilize the frame members 200. FIG. 9*c* discloses an embodiment comprising the vertically loaded member 302 that may be bent toward the forward end 904. A portion of the vertically loaded member 906 forms an acute angle 907 with the bottom member 301. FIG. 9*d* discloses an embodiment with the vertically loaded member 302 located at the forward end 904 of the side plate member 300.

FIGS. 10*a*-10*d* disclose embodiments of the vertically loaded member 302. FIG. 10*a* discloses an embodiment comprising the vertically loaded member with one set of slots 1000 configured to support one side plate member 300 on a left side 1001 and one side plate member on a right side 1002. The frame members 200 may include one side plate member 300 for easy assembly of the frame 100. FIG. 10*b* discloses an embodiment of the vertically loaded member 302 configured to support two side plate members on the left side 1001 and on the right side 1002. The side plate members may be different thicknesses. The different thicknesses may be configured to support different loads from the vehicle body. FIG. 10*c* discloses an embodiment of the vertically loaded plate member 302 configured to support two side plate members 300 with offset tabs. The members 300 may connect to the vertically loaded member 302 at different locations. FIG. 10*d* discloses an embodiment with the vertically loaded member 302 configured to support three side plate members 300 at different intervals 1003. Being spread out, the side plate members 300 may add structural integrity to the vehicle frame 100.

FIGS. 11*a*-11*d* disclose embodiments of vehicles using the vehicle frame members 200. The frame members 200 may simplify frame assembly for wheeled vehicles 1100; such as cars, buses, trucks, semi-trucks, motorcycles, vans, and the like. Also, the present invention may be applied to watercraft 1101, such as motorboats, ferries, cruise ships, kayaks, canoes, row boats, submarines, and the like. Also, the present invention may be incorporated into construction equipment 1102, such as tractors, back hoes, bull dozers, excavators, road planers, mining machines, steam rollers, trenchers, front loaders, and the like. Similarly, the invention may be used for aircraft 1103, such as passenger planes, biplanes, helicopters, spacecraft, rockets, and the like.

Whereas the present invention has been described in particular relation to the drawings attached hereto, it should be understood that other and further modifications apart from those shown or suggested herein, may be made within the scope and spirit of the present invention.

What is claimed is:

1. A vehicle frame, comprising:
   a plurality of frame members including at least two side plate members interlocked with a bottom plate member and a vertically loaded plate member;
   the bottom plate member and the vertically loaded plate member are non-parallel; and
   the side plate members support the bottom plate member and the vertically loaded plate member through a plurality of tab and slot connections;
   wherein the bottom plate is configured to support an internal side plate member.

2. The frame of claim 1, wherein the plurality of tab and slot connections is welded in place.

3. The frame of claim 1, wherein at least a portion of the vertically loaded plate forms an obtuse angle with the bottom plate member.

4. The frame of claim 1, wherein the vertically loaded plate member is bent along its width.

5. The frame of claim 1, wherein the vertically loaded plate member has tab connections that are non-parallel.

6. The frame of claim 5, wherein the non-parallel tab connections are configured to enter slots formed into the side plate member.

7. The frame of claim 1, wherein the tab connections are located on an edge of at least one of the plate members.

8. The frame of claim 1, wherein the vertically loaded member is configured to support the internal side plate member.

9. The frame of claim 1, wherein the internal side plate member is configured to be attached and welded to the bottom plate member and vertically loaded member before the side plate member is attached and welded to the bottom plate member and vertically loaded member.

10. The frame of claim 1, wherein the vertically loaded member is configured to attach to the internal side plate members and side plate members.

11. The frame of claim 10, wherein the internal side plate member comprises tabs that enter slots in the vertically loaded member, the vertically loaded member comprises tabs that enter slots in the side plate member, interlocking and holding the frame members together.

12. The frame of claim 1, wherein the plurality of frame members form a motorized trike frame.

13. The frame of claim 1, wherein the tab and slot connections comprise slots that are shorter than tabs and the tabs extend beyond an exit of the slots.

14. The frame of claim 1, wherein the side plate member is connected to the vertically loaded plate member at a rear end of the side plate member and also attached is a forward vertical member at a forward end of the side plate member.

15. The frame of claim 1, wherein the plate members are additionally welded together at seams formed between the plate members.

16. The frame of claim 1, wherein the tab and slot connections are configured to carry a weight of the frame members.

17. The frame of claim 1, wherein the tab and slot connections are configured to position the frame members for welding.

* * * * *